(No Model.) 2 Sheets—Sheet 1.
J. M. McCLAVE.
BREAD RAISING AND BAKING APPARATUS.
No. 366,968. Patented July 19, 1887.
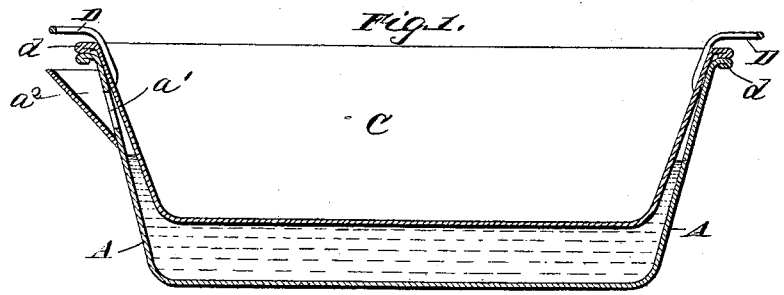
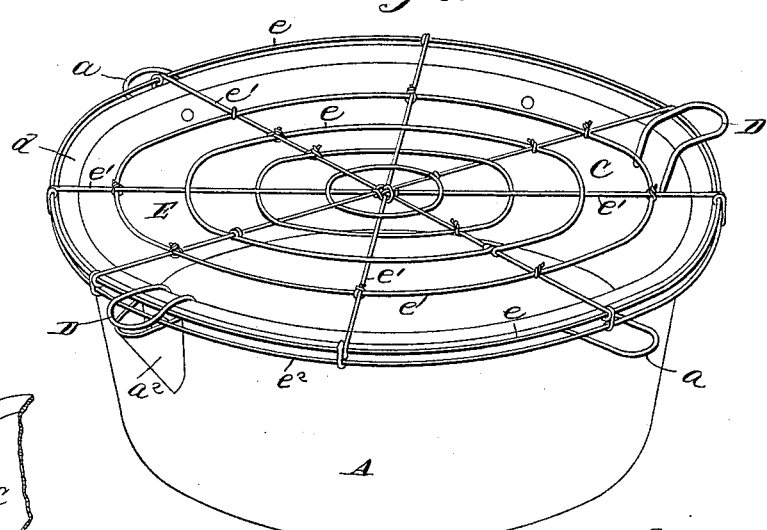
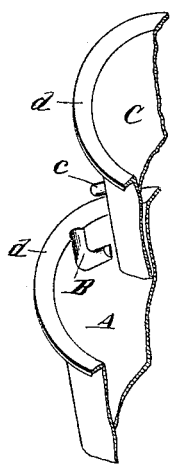
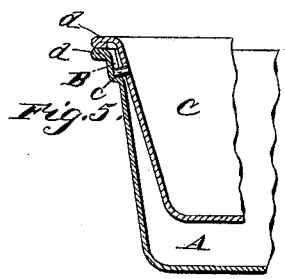
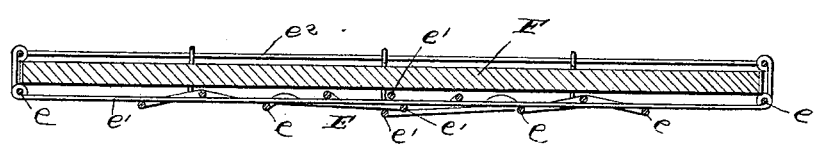
Witnesses
C. D. Taylor
E. G. Siggers
Inventor
James M. McClave
By his Attorneys
C. A. Snow & Co.
N. PETERS, Photo-Lithographer, Washington, D. C.

(No Model.) 2 Sheets—Sheet 2.
J. M. McCLAVE.
BREAD RAISING AND BAKING APPARATUS.
No. 366,968. Patented July 19, 1887.
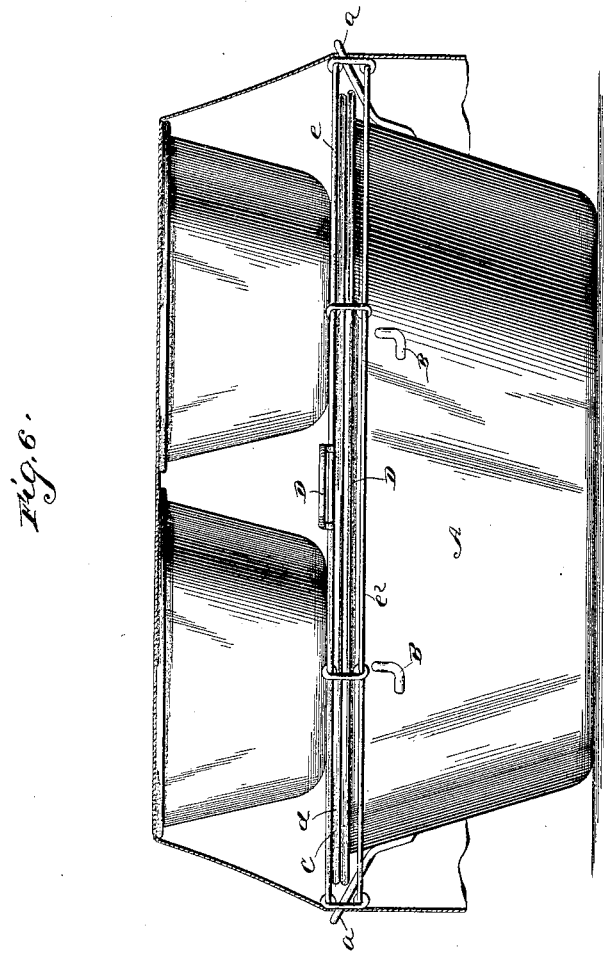

UNITED STATES PATENT OFFICE.

JAMES MASON McCLAVE, OF EAST SPRINGFIELD, OHIO.

BREAD RAISING AND BAKING APPARATUS.

SPECIFICATION forming part of Letters Patent No. 366,968, dated July 19, 1887.

Application filed January 12, 1887. Serial No. 224,141. (No model.)

*To all whom it may concern:*

Be it known that I, JAMES MASON MCCLAVE, a citizen of the United States, residing at East Springfield, in the county of Jefferson and State of Ohio, have invented new and useful improvements in Bread Raising and Baking Apparatus, of which the following is a specification.

My invention relates to apparatus for raising and baking bread, and aims to provide means whereby the bread will rise more evenly than heretofore, and also to provide a device by which the bread may be more readily handled in quantities. These objects I attain by the use of the devices hereinafter fully described, and of which certain novel features are pointed out in the claims.

In the drawings, Figure 1 is a sectional view of the bread-raising pan. Fig. 2 is a perspective view showing the bread-raising pan with a wire rack over its top. Fig. 3 is a detailed view in perspective, showing the manner of fastening the two pans comprising the bread-raiser. Fig. 4 is a sectional view showing the rack as supporting a kneading-board. Fig. 5 is a detail sectional view, and Fig. 6 is a side elevation showing the arrangement of the several parts after the bread has been made into loaves.

In carrying out my invention I employ a pan, A, constructed of some heat-retaining material and of any desired dimensions or shape, that shown in the present case being a flat circular pan. This pan is provided with suitable handles, $a$, arranged diametrically opposite each other, and also with an opening, $a'$, through which warm water is poured into the pan. A guard or funnel, $a^2$, is arranged around this opening $a'$ to direct the water therethrough, and also to prevent the loss of water by overflow. On the inner face of the side of the pan A, I provide two or more L-shaped grooves, B, the function of which will soon appear.

C is a pan of the same shape as the pan A, but of a lesser depth, and having its sides flared to a greater degree. This pan C fits within the pan A, and its sides are provided on their faces with pins $c$, which engage the grooves B on the inner face of the side of the pan A, whereby the pan C is supported within the pan A. The inner pan is also provided with suitable handles, D, and both pans are provided at their upper edges with the usual outwardly-turned rims or flanges, $d$. In practice the rim of the upper pan rests upon the rim of the lower pan, so as to form a water-tight joint, and thereby prevent the escape of the water over the edge of the border-pan.

E is a rack composed of a number of wires, $e$, bent and arranged so as to form a series of concentric rings, and held together by a series of radial wires, $e'$, to which they are secured either by looping or twisting the wires around each other at their points of intersection or by fastening them at said points by means of wire ties.

As shown, the edge of the rack is so constructed as to provide a flange or rim, which serves to prevent the rack slipping from the pan, and also to hold the kneading-board, as will be presently more fully referred to. This rim I provide by employing an additional wire ring, $e^2$, having a diameter equal to that of the outside ring of the concentric series, and I secure this ring directly below said outside ring by bending the ends of the radial wires $e'$ downward and securing said ring $e^2$ thereto.

F represents a kneading-board, which is made of the same shape as the wire rack and of a size to fit easily and snugly within the same when being warmed prior to use.

In use the sponge for the bread is made up in the inner pan, C, or bread-pan, and warm water poured through the opening $a'$ into the outer or water pan, A. The pans are then set aside in some convenient place for the sponge to rise.

Care should be taken to have the water poured in the pan at the proper temperature, as it should not be below 75° nor above 90° Fahrenheit, in order to secure proper activity of fermentation, and I have found that a temperature ranging from 78° to 86° produces the best results.

The pan should not be set too near the fire, unless the temperature of the room is below 60°.

When the sponge has risen, it is worked down and set aside to rise the second time. When it has risen enough to work into loaves, the kneading-board, covered by the rack, is placed on the stove for a few minutes, the rack being between the board and the stove. The board is thus warmed without being burned or charred.

When the board has been warmed sufficiently, the rack is removed, the board placed on the table or bench, and the dough kneaded and made into loaves thereon. After the dough has been made into loaves it is placed in the bake-pans. The water in the bread-raising pan is heated to the boiling-point, and the rack is then placed over the pan and the bake-pan containing the dough placed on the rack, as shown in Fig. 6. The whole is then covered with a cloth and set aside for the final rising. When the bread is ready for baking, the entire lot is carried to the oven at once upon the rack. In like manner the rack can be used to convey the entire lot of bread from the oven after baking.

It will be seen that by the use of my device a uniform degree of heat is applied to all parts of the dough or sponge, and it consequently rises equally throughout, thus obviating the necessity of constant care and attention on the part of the baker. When the two pans are not being used as a bread-raiser, they can be separated and used for other culinary purposes.

I have shown the parts of my invention as being circular; but I may make them square, or any other shape preferred.

Having thus described my invention, I claim—

1. The combination, with the kneading-board, of the wire rack to inclose the same, consisting of a series of radial wires and concentric rings, and provided with a depending rim of the same outline as the kneading-board, as set forth.

2. The herein-described rack made of a series of wires forming a net-work, the outer edges of the wire being extended to provide a depending rim, as set forth.

3. The wire rack consisting of a series of radial wires and a series of concentric wire rings, the several wires being secured together at their points of intersection, and the depending rim at the periphery of the rack, substantially as described.

In testimony that I claim the foregoing as my own I have hereto affixed my signature in presence of two witnesses.

JAMES MASON McCLAVE.

Witnesses:
   J. W. HAMILTON,
   JOHN R. SHANE.